United States Patent
Park et al.

(10) Patent No.: US 10,399,394 B2
(45) Date of Patent: Sep. 3, 2019

(54) SINGLE AXIS EARTH MAGNETIC FIELD SENSOR FOR MOTION DETECTION IN TPMS APPLICATION

(71) Applicant: Infineon Technologies AG, Neubiberg (DE)

(72) Inventors: Jooil Park, Kyungki-do (KR); Felix Gow, Singapore (SG); Thomas Lange, München (DE); Karine Pillet, München (DE); Wolfgang Raberg, Sauerlach (DE); Maximilian Werner, Fischach (DE); Ren Yi You, Shanghai (CN)

(73) Assignee: Infineon Technologies AG (DE)

( * ) Notice: Subject to any disclaimer, the term of this patent is extended or adjusted under 35 U.S.C. 154(b) by 338 days.

(21) Appl. No.: 15/378,490

(22) Filed: Dec. 14, 2016

(65) Prior Publication Data

US 2018/0162183 A1   Jun. 14, 2018

(51) Int. Cl.
*G01L 1/16* (2006.01)
*B60C 23/04* (2006.01)
*G01D 5/14* (2006.01)
*G01L 17/00* (2006.01)

(52) U.S. Cl.
CPC ...... *B60C 23/0489* (2013.01); *B60C 23/0461* (2013.01); *B60C 23/0488* (2013.01); *G01D 5/14* (2013.01); *G01L 17/005* (2013.01)

(58) Field of Classification Search
CPC ............ B60C 23/0489; B60C 23/0488; B60C 23/0461; B60C 23/0486; G01L 17/005; G01D 5/14
See application file for complete search history.

(56) References Cited

U.S. PATENT DOCUMENTS

| | | | | |
|---|---|---|---|---|
| 6,014,599 A * | 1/2000 | Inoue | .................... | B60C 23/061 324/178 |
| 7,392,119 B2 * | 6/2008 | Allard | ................. | B60C 23/0416 340/445 |
| 7,646,195 B2 | 1/2010 | Salfelner | | |
| 8,498,785 B2 * | 7/2013 | Juzswik | ............. | B60C 23/0416 701/29.1 |
| 8,565,967 B2 | 10/2013 | Steiner | | |
| 9,145,034 B2 * | 9/2015 | Gotschlich | ............ | B60C 23/062 |
| 9,849,736 B2 * | 12/2017 | Watanabe | ........... | B60C 23/0416 |

(Continued)

*Primary Examiner* — Lisa M Caputo
*Assistant Examiner* — Nathaniel T Woodward
(74) *Attorney, Agent, or Firm* — Design IP (57) ABSTRACT

A sensor module is provided that includes a magnetic sensor and a microcontroller. The magnetic sensor is configured to measure a magnitude of a magnetic field component of an Earth magnetic field projected on a sensing axis of the magnetic sensor and is configured to generate a measurement signal. The magnetic sensor is configured to rotate about an axis through the Earth magnetic field such that the measurement signal oscillates between a first and second extremas as the magnitude of the magnetic field component projected onto the sensing axis changes due to rotation of the magnetic sensor about the axis. The microcontroller is configured to receive the measurement signal, acquire a predetermined number of measurement samples over a sampling period, calculate a variance value of the acquired measurement samples, and determine whether the magnetic sensor is rotating about the axis based on a threshold test of the variance value.

30 Claims, 6 Drawing Sheets

(56) References Cited

U.S. PATENT DOCUMENTS

| | | | |
|---|---|---|---|
| 2005/0179530 A1* | 8/2005 | Stewart | B60C 23/0416 340/447 |
| 2006/0238356 A1* | 10/2006 | Tucker | G06K 19/04 340/572.8 |
| 2012/0253590 A1* | 10/2012 | Fink | B60C 23/0408 701/34.4 |
| 2014/0043153 A1* | 2/2014 | Lim | B60C 23/0486 340/447 |
| 2014/0111326 A1* | 4/2014 | Borisenko | G01M 17/02 340/447 |
| 2014/0195104 A1* | 7/2014 | Hammerschmidt | B60C 23/062 701/32.7 |
| 2014/0195107 A1 | 7/2014 | Park et al. | |
| 2015/0116105 A1 | 4/2015 | Steiner et al. | |
| 2017/0066293 A1* | 3/2017 | Watanabe | B60C 23/0489 |
| 2017/0113698 A1* | 4/2017 | Zwegers | G01P 3/488 |

\* cited by examiner

← Earth magnetic field vectors

FIG 2B

Earth surface

SINGLE AXIS EARTH MAGNETIC FIELD SENSOR FOR MOTION DETECTION IN TPMS APPLICATION

FIELD

The present disclosure relates generally to a device and to methods for motion detection, and, more particularly, magnetic sensors configured to detect motion of a vehicle.

BACKGROUND

Tire Pressure Monitoring Systems (TPMS) play an important role in vehicle safety and emissions reduction. Several countries and governing bodies have enacted mandatory regulations that require vehicles to have TPMS; for example U.S., European Union and Korea. A majority of this market is served by direct tire pressure monitoring systems, in which each tire contains a TPMS sensor module. Due to this high market penetration, the cost and the size of these sensor modules is of high importance. Current sensor modules consist of a tire pressure sensor (TPS) integrated circuit, a battery, antennas for communication, and a very small number of discrete passive electrical components.

Most sensor modules use a motion detection sensor to conserve the life of the sensor module's battery by entering power-down mode while the vehicle is parked. In this way, the service life of the sensor and its non-replaceable battery can be maximized. Today, most common way to measure the motion of wheel it is to use a radial direction acceleration sensor (e.g., a z-axis acceleration sensor, x-axis acceleration) or shock sensors. Thus, the typical motion detection sensor responds to g-force and is either an accelerometer or a shock sensor.

In order to detect if the vehicle is driving or parked the acceleration sensors is sampled according to a sampling period. Normally a z-axis acceleration sensor is used to measure an absolute value of the centrifugal force which represents the vehicle speed. The minimum detectable speed is limited by the acceleration offset error which can be set during calibration of the sensor in the semi-conductor production. State of the art calibration techniques yield an offset error of +/−3.5 g, which limits the motion detection threshold to approximately 20 km/h. That is, motion detection cannot be detected below 20 km/h.

Another disadvantage of acceleration sensors is that they require a calibration process to measure absolute acceleration at radial direction (e.g., offset calibration, temperature calibration, sensitivity calibration, etc.). The calibration process is performed in the semi-conductor production line. To avoid additional life time drifts and to keep the same high accuracy for the offset error, the application may also need to have auto-calibration process to remain the accuracy over its lifetime. The calibration process requires more cost and time at the sensor manufacture and auto-calibration in application requires more energy. The offset error dominates the minimum vehicle speed for motion detection, which is currently limited to 20 km/h with this solution.

TPMS sensors that employ microelectromechanical systems (MEMS) acceleration sensors must be handled carefully prior to installation into a wheel, to prevent breakage of the accelerometer due to mechanical resonance. Thus, the risk of breakage is high.

In addition, TPMS sensors that employ off-chip shock sensors contain circuitry that conditions the signal from the shock sensor, so that motion can be detected. TPMS sensor software for sensors with shock-sensing technology normally requires several shocks to be observed before the sensor is considered to be in motion. Also, the shock sensors are very-high impedance devices, and therefore the signal conditioning circuitry must also be of high input impedance. Unfortunately, this normally results in a circuit that is inherently susceptible to electromagnetic interference (EMI). The result is a sensor that may be operating and expending energy when the vehicle is not moving. Furthermore, the external mounting of the shock sensors requires additional printed circuit board (PCB) space and they are also quite costly compared to an integrated solution (e.g., acceleration sensors). The additional calibration on PCB-level requires more cost and time as special equipment is required in the production line of a Tier 1.

Therefore, an improved motion detection sensor may be desirable.

SUMMARY

Embodiments provide apparatuses, methods and systems for detecting motion.

According to an embodiment, a sensor module is provided. The sensor module includes a magnetic sensor configured to measure a magnitude of a magnetic field component of an Earth magnetic field projected on a sensing axis of the magnetic sensor and configured to generate a measurement signal based on the magnitude of the magnetic field component projected on the sensing axis. The magnetic sensor is further configured to rotate about an axis through the Earth magnetic field such that the measurement signal oscillates between a first extrema and a second extrema as the magnitude of the magnetic field component projected onto the sensing axis changes due to rotation of the magnetic sensor about the axis. The sensor module further includes a microcontroller configured to receive the measurement signal from the magnetic sensor, acquire a predetermined number of measurement samples from the measurement signal over a predetermined sampling period, calculate a variance value of the acquired measurement samples, and determine whether the magnetic sensor is rotating about the axis based on a threshold test of the variance value.

According to another embodiment, a method of motion detection is provided. The method of motion detection includes measuring a magnitude of a magnetic field component of an Earth magnetic field projected on a sensing axis of a magnetic sensor, wherein the magnetic sensor is configured to rotate about an axis through the Earth magnetic field; generating a measurement signal based on the magnitude of the magnetic field component projected on the sensing axis, wherein, as the magnetic sensor rotates about the axis through the Earth magnetic field, the measurement signal oscillates between a first extrema and a second extrema as the magnitude of the magnetic field component projected onto the sensing axis changes due to rotation of the magnetic sensor about the axis; acquiring a predetermined number of measurement samples from the measurement signal over a predetermined sampling period; calculating a variance value of the acquired measurement samples; and determining whether the magnetic sensor is rotating about the axis based on a threshold test of the variance value.

According to another embodiment, a tire pressure monitoring system (TPMS) is provided. The TPMS includes a tire having an axis of rotation; a magnetic sensor fixed to the tire and configured to monitor rotation of the tire by measuring a magnitude of a magnetic field component of an Earth magnetic field projected on a sensing axis of the magnetic sensor, wherein the magnetic sensor is configured to generate a measurement signal based on the magnitude of the magnetic field component projected on the sensing axis, wherein the magnitude of the magnetic field component projected on the sensing axis changes as the magnetic sensor rotates about the axis of rotation; and a microcontroller configured to receive the measurement signal from the magnetic sensor, acquire a predetermined number of measurement samples from the measurement signal over a predetermined sampling period, calculate a variance value of the acquired measurement samples, and determine whether the tire is rotating about the axis of rotation based on a threshold test of the variance value.

BRIEF DESCRIPTION OF THE DRAWINGS

Embodiments are described herein making reference to the appended drawings.

DETAILED DESCRIPTION

In the following, a plurality of details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field (e.g., the Earth's magnetic field), an electric field, a pressure, a force, a current or a voltage, but is not limited thereto. A sensor device, as described herein, may be a an angle sensor, a linear position sensor, a speed sensor, motion sensor, a pressure sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.) corresponding to detecting and/or measuring the magnetic field pattern of an element that generates the magnetic field (e.g., a magnet, a current-carrying conductor (e.g. a wire), the Earth, or other magnetic field source).

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back bias magnet to form a sensor module, sensor device, or the like.

One or more magnetic field sensor elements, or for short a magnetic field sensors, included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from the magnetic field sensor element in the form of raw measurement data and derives, from the sensor signal, a measurement signal that represents the magnetic field. The sensor circuit may include a digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, Hall plates, vertical Hall effect devices, or magneto-resistive sensors, often referred to as XMR sensors which is a collective term for anisotropic magneto-resistive (AMR), giant magneto-resistive (GMR), tunneling magneto-resistive (TMR), etc.

Figure 1:
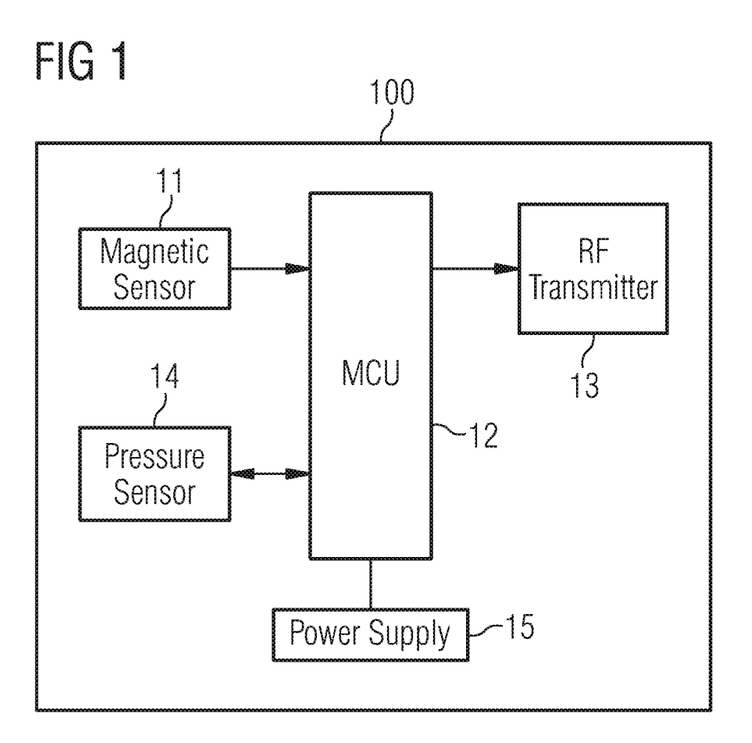
FIG. 1 illustrates a monolithic Tire Pressure Monitoring System (TPMS) sensor module according to one or more embodiments.

FIG. 1 illustrates a monolithic TPMS sensor module 100 including a magnetic sensor 11 according to one or more embodiments. The TPMS sensor module 100 is a direct TPMS sensor mounted inside the tire. A magnetic sensor 11 can be incorporated as part of a typical semiconductor technology. Therefore, a magnetic sensor 11 can enable a monolithic TPMS sensor 100 which includes the sensor 11, a microcontroller unit (MCU) 12, radio frequency (RF) transmitter 13, and a microelectromechanical systems (MEMS) pressure sensor 14 based on a detection of motion (i.e., rotation) of a rotating member, such as a wheel. A power supply 15 (e.g., a battery cell) is further provided to supply power to the TPMS sensor 100 and its components.

The magnetic sensor 11 may be a single-axis or multi-axis sensor with one sensing axis (i.e., sensitivity-axis) aligned in the any arbitrary single direction axis (e.g., x-axis, z-axis, etc.) and configured to measure the Earth's magnetic field in the direction of the sensing axis. In particular, the magnetic sensor 11 includes at least one sensor element that has a sensing axis utilized for motion detection that is sensitive to the Earth's magnetic field.

The MCU 12 receives measurement values from at least one sensor element and/or sensor circuit of the magnetic sensor 11, and calculates a variance of measurement samples taken by the magnetic sensor 11. If the variance is greater than a threshold value, motion is detected by the MCU 12 and further action is taken (e.g., tire pressure monitoring is initiated).

Figure 2A:
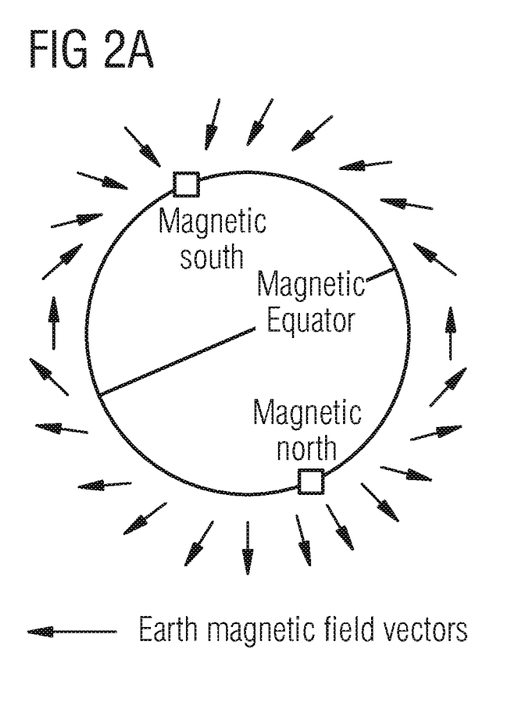
FIG. 2A illustrates Earth magnetic field vectors around the Earth according to one or more embodiments.
Figure 2B:
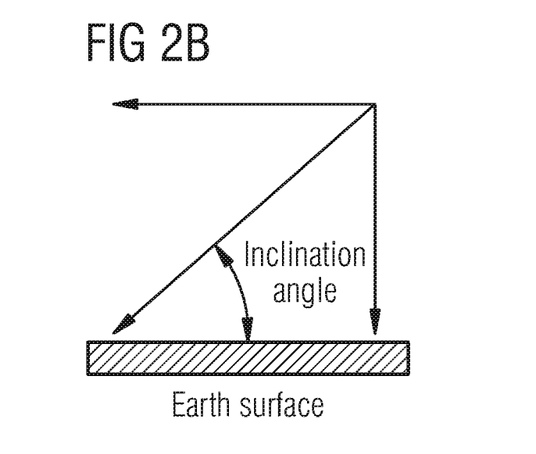
FIG. 2B shows an inclination angle of one of Earth's magnetic field vectors relative to the Earth's surface according to one or more embodiments.

The intensity of the Earth's magnetic field ranges from about 250 mG to about 650 mG depending on location, and an inclination angle of the field vectors also has dependency on location of the Earth, ranging from 0° to 90°. FIG. 2A illustrates Earth magnetic field vectors around the Earth. Each magnetic field vector has an inclination angle relative to the Earth's surface depending on location on the Earth. For example, FIG. 2B shows an inclination angle of one of Earth's magnetic field vectors relative to the Earth's surface. Since Earth's magnetic field vectors are everywhere, the magnetic sensor 11 may use the Earth magnetic field vectors as a reference vectors to detect the rotation of the wheel. For example, the magnetic sensor 11 may measure a magnitude of one or more Earth magnetic field vectors (i.e., magnetic field components of the Earth magnetic field) projected on a sensing axis of the magnetic sensor 11. As used herein, a magnetic field vector and a magnetic field component may be used interchangeably.

Figure 3A:
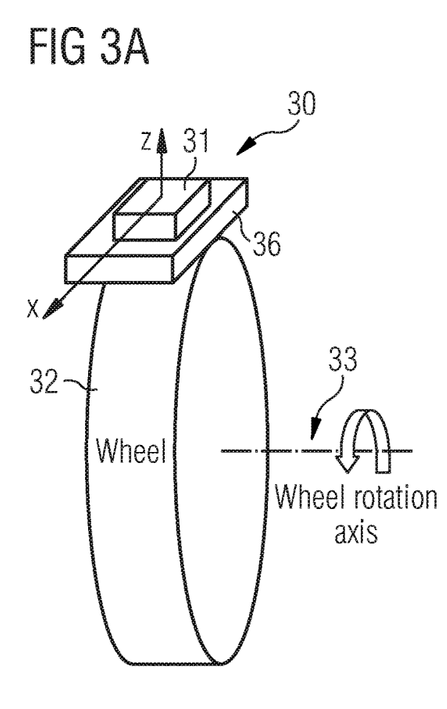
FIGS. 3A and 3B show two mounting arrangements of a direct TPMS module according to one or more embodiments.
Figure 3B:
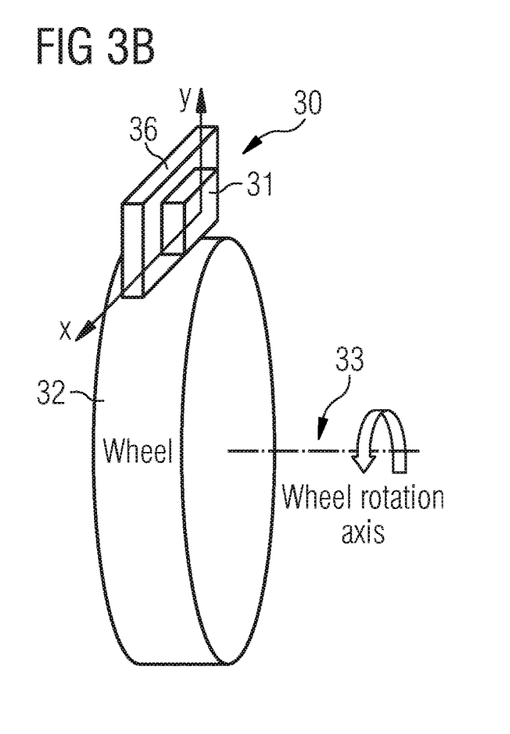

FIGS. 3A and 3B show two mounting arrangements of a direct TPMS module 30 having a magnetic sensor 31 (e.g., a TMR sensor) integrated with a PCB 36. The TPMS module 30 is mounted to a fixed position inside the wheel 32 (e.g., to the back of the valve stem on each wheel of a vehicle). The sensing axis of the magnetic sensor 31 used for motion detection is aligned in the x-direction. As noted above, the magnetic sensor 31 may be any magnetic sensor with a sensing axis configured to sense Earth's magnetic field vectors and output measurement values or measurement signals thereof. Thus, the magnetic sensor 31 will detect variations of magnetic field strength relative to an orientation of the sensing axis in the form of a sinusoid as the sensing axis rotates about the wheel rotation axis 33 as the wheel 32 rotates.

Figure 4:
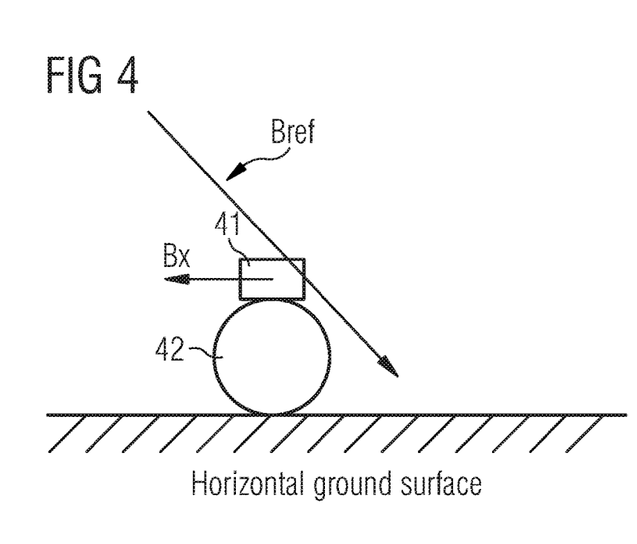
FIG. 4 illustrates a cross-sectional view of a mounted tire pressure sensor (TPS) according to one or more embodiments.

FIG. 4 illustrates a cross-sectional view of a mounted tire pressure sensor (TPS) with a magnetic sensor 41 having a sensing axis used for motion detection aligned in the x-direction. Thus, the sensing direction of the magnetic sensor 41 is Bx and the Earth magnetic field vector is a reference vector Bref used by the magnetic sensor 41 for detection of rotation of the wheel 42. In particular, the magnetic sensor 41 measures a magnitude of one or more Earth magnetic field components projected on a sensing axis Bx of the magnetic sensor 41. The x-axis of the magnetic sensor 41 is aligned with Earth's magnetic north (i.e., tangential to a circumference of a circle that is concentric with the wheel 42 or axis of rotation) while the z-axis of the magnetic sensor 41 is aligned anti-parallel with the Earth's magnetic field. As a result, during rotation of a wheel 42, the sensing axis Bx of the magnetic field sensor 41 rotates tangentially around the wheel 42 (or axis of rotation) such that the magnitude of the magnetic field component projected on the sensing axis Bx changes as the magnetic sensor 41 rotates about the axis of rotation of the wheel 42.

For example, as the magnetic sensor 41 rotates about the axis of rotation of the wheel 42, the sensing axis Bx will be aligned exactly parallel to the Earth's magnetic field vector Bref at a certain point during rotation. Also, there will be a point where the sensing axis Bx of the magnetic field sensor 41 is aligned exactly anti-parallel to the Earth's magnetic field vector Bref. This phenomenon of alternating between parallel and anti-parallel alignments with respect to Bref occurs independent of location on Earth. Consequently, the magnetic sensor 41 may detect variations of a magnitude in magnetic field strength of the magnetic field component relative to the orientation of the sensing axis in the form of a sinusoid as the sensing axis rotates about the wheel rotation axis. Furthermore, a sensor circuit of the magnetic sensor 41 may generate measurement signal resembling a sinusoidal signal ranging from a first maxima (e.g., −Bref) to a second maxima (e.g., +Bref) based on the measured magnitude of the Earth magnetic field components projected on the sensing axis using the measurement values detected by the sensor element(s) of the magnetic sensor 41.

Figure 5A:
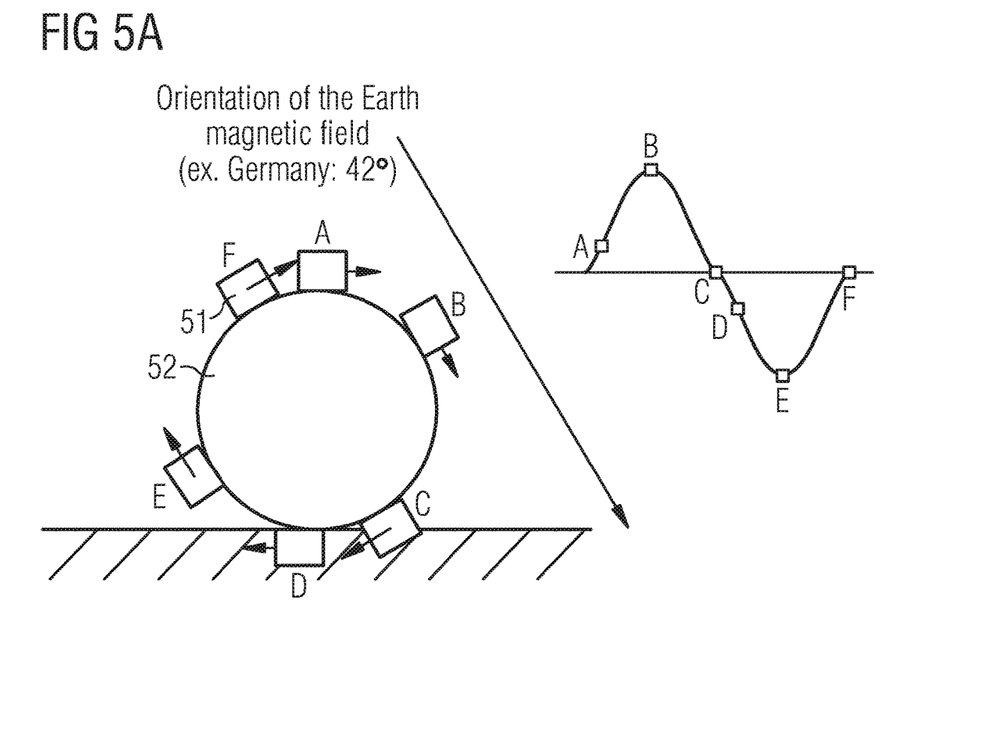
FIGS. 5A and 5B illustrate cross-sectional views of a mounted magnetic sensor having a sensing axis used for motion detection aligned in the x-direction and a corresponding measurement signal generated during rotation according to one or more embodiments.
Figure 5B:
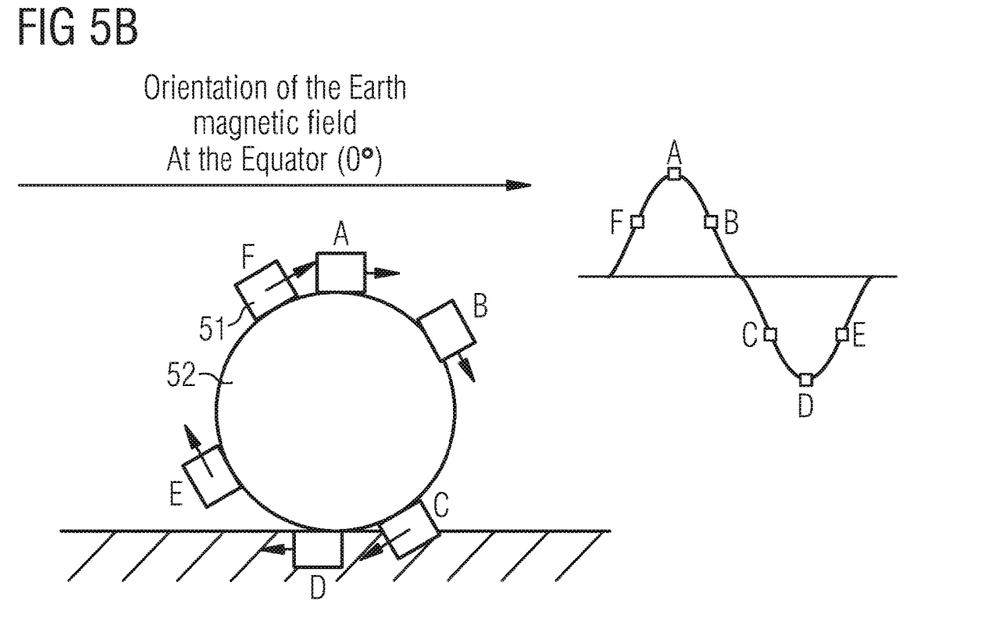

FIGS. 5A and 5B illustrate cross-sectional views of a mounted magnetic sensor 51 having a sensing axis used for motion detection aligned in the x-direction and a corresponding measurement signal generated during rotation according to one or more embodiments.

In particular, FIG. 5A shows a magnetic sensor 51 mounted on a wheel 52 in a fixed position. In this example, the wheel 52 is located in Germany at which the Earth's magnetic field vector Bref has an inclination angle of 42 degrees with respect to the ground surface. As the wheel 52 rotates about its axis, the magnetic sensor 51 rotates from position A to position F, and the alignment of the sensing axis varies with to the Earth's magnetic field vector Bref. For example, at position B, the sensing axis is parallel to Bref. Consequently, the measurement value measured by a sensor element of magnetic sensor 51 is at a maximum (i.e., a first maxima). At position E, the sensing axis is anti-parallel to Bref. Consequently, the measurement value measured by a sensor element of magnetic sensor 51 is at a minimum (i.e., a second maxima). Between position A and E, the measurement value varies between the maximum and minimum values such that a sinusoidal signal is ranging from −Bref to +Bref is generated. The presence of a sinusoidal signal is detected by the sensor circuit or the microcontroller of the sensor module and indicates the wheel 52 is in motion. Furthermore, a frequency of the sinusoidal signal may be correlated to a rotation speed of the wheel.

In another example, FIG. 5B shows a magnetic sensor 51 mounted on a wheel 52 in a fixed position but the wheel 52 is located at the Earth's magnetic equator. At the magnetic equator, the Earth's magnetic field vector Bref has an inclination angle of 0 degrees with respect to the ground surface. As the wheel 52 rotates about its axis, the magnetic sensor 51 rotates from position A to position F, and the alignment of the sensing axis varies with to the Earth's magnetic field vector Bref. While the inclination angle of Bref is different when compared to the example illustrated in FIG. 5A, the result of producing a sinusoidal signal is the same. That is, although the maximum and the minimum measurement values occur at position A and D, respectively, as compared with position B and E in FIG. 5A, the sinusoidal signal keeps its general format such that motion can be detected by detecting the sinusoid waveform of the measurement signal.

It will be appreciated, that the a magnetic sensor 51 may be configured such that the maxima and minima are detected according to a different sensing scheme, as long as the magnitude of a magnetic field component of an Earth magnetic field projected on a sensing axis of the magnetic sensor changes based on the rotation of the magnetic sensor (or sensing axis) through the Earth magnetic field. For example, the maxima and minima may not be detected at parallel and anti-parallel alignments, respectively, as described in FIGS. 5A and 5B. For example, in the case of AMR sensors, a resistance for an AMR sensor element changes according to a square of a sine of an angle of the magnetic field component projected on the sensing axis. However, a measurement signal still oscillates between a first extrema and a second extrema with a same frequency as the rotation of the wheel as the magnitude of the magnetic field component projected onto the sensing axis changes due to rotation of the magnetic sensor 51 about an axis.

Furthermore, while FIGS. 5A and 5B show the TPMS in an ideal application, in real-world applications, the actual magnetic field vector at the TPS position will be sum of all magnetic field sources. The first dominant magnetic field is the Earth magnetic field (e.g., Bref) and the second dominant magnetic field may be one or more constant stray fields which are induced by ferromagnetic material in proximity to the TPS (e.g., a steel wheel, chassis and body of a vehicle).

However, the constant stray fields from the wheel and tire do not change the general format or shape of the sinusoidal signal generated from the motion of the magnetic sensor moving through the Earth's magnetic field. Instead, the constant stray fields from the wheel and tire may only change the offset level of sinusoidal wave measured by the magnetic sensor during rotation. That is, a variance between measurement samples due to the sinusoidal waveform is still present regardless of the offset induced by the stray fields. Additionally, the constant stray fields that come from the vehicle chassis and body only change the direction and strength of sensed magnetic Earth field. In other words, only the Bref vector is changed. These stray fields are not an issue because the sinusoidal wave keeps its general format and thus a variance between measurement samples can be detected such that a rotation of the wheel is detected. That is, since only an arbitrary Bref vector is needed to generate a sinusoidal measurement signal and detect a variance between measurement samples, these stray fields do not impact the ability of magnetic sensor (e.g. via a microcontroller) to detect a variance in measurements as rotates through the Earth's magnetic field.

Only the magnetic sensor rotating within the Earth's magnetic field is needed in order to detect a variance in measurements (i.e., samples). Accordingly, a magnetic sensor according to one or more embodiments will take a predetermined number of samples with certain time intervals in between, and output the samples to a microcontroller of the sensor module. The microcontroller (MCU), in turn, is configured to calculate the variance of those samples, meaning an amount of change within that measurement signal, to determine whether a wheel is in motion or in a parked state.

Figure 6:
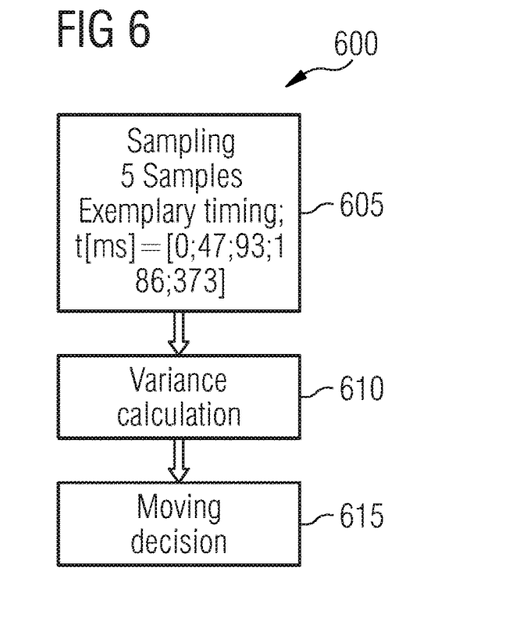
FIG. 6 illustrates a flow diagram of a motion detection method according to one or more embodiments.

For example, FIG. 6 illustrates a flow diagram of a motion detection method 600 according to one or more embodiments. For example, as noted above, the TPMS sensor module (e.g., TPMS sensor module 100) includes a magnetic sensor and an MCU. The magnetic sensor is configured to output a measurement signal to an MCU of the TPMS sensor module. The measurement signal corresponds to a signal generated by the magnetic sensor (e.g., generated by a sensing circuit based on measurement values received from sensor element(s)) from measuring the Earth's magnetic field vector Bref according to the sensing axis of the magnetic sensor. In operation 605, a predetermined number of measurement samples are taken by the MCU over a predetermined sampling period. For example, 5 measurement samples may be taken from the measurement signal received from the magnetic sensor over a sampling period of 10 seconds. At the lapse of the sampling interval, a motion determination is made. For example, using three successive sampling periods, a motion determination made by the MCU may be not moving, not moving, moving. In addition, the MCU may be configured to use uniform or non-uniform sampling over the sampling period. For example, that is, each sample taken may be uniformly spaced apart from each other using a same interval, or non-uniformly spaced apart using at least two different intervals within the sampling period. For example, using non-uniform sampling, a sampling interval may vary such that sampling times are at 0 ms, 47 ms, 93 ms, 186 ms and 373 ms, however, the sampling intervals are not limited thereto.

In operation 610, the MCU calculates a variance value from the acquired samples.

In operation 615, the MCU makes a moving determination by applying the calculated variance to a threshold test. In particular, a wheel is determined to be moving if the variance is equal to or greater than (or simply greater than, based on implementation) a predetermined variance threshold.

For example, if a vehicle is not moving, the magnetic sensor may measure the Earth's magnetic field plus some noise of the ADC and the magnetic sensor will be measured on top of that due to stray fields, which is actually very small. However, since the magnetic sensor is not rotating through the Earth's magnetic field, the variance between multiple samples will be small (e.g., each measurement of the Earth's magnetic field will be the same, plus the noise from the stray fields will be small). Thus, in a parked vehicle, the variance will be small (limited to the stray field noise) and less than the predetermined threshold. In this case, the MCU is configured to determine that the vehicle is not moving.

On the other hand, if the vehicle is moving, the same stray field noise will be present, but the magnetic sensor will also measure an additional varying+/−B-field as a result of the magnetic sensor rotating through the Earth's magnetic field, where the +/−B-field B is Earth's magnetic field with an amplitude depending on the Earth's location and driving direction of the vehicle. While the wheel is rotating this means that the magnetic sensor is also rotated inside the magnetic field, resulting in measurements oscillating between offset−B to offset+B. Due to the oscillation between maximum and minimum B values, a sinusoidal waveform is generated from which a variance can be calculated by the MCU. If a certain amount of samples is taken with certain non-uniform intervals in between those samples, the samples will show a variance that exceeds a threshold when compared to the case of the vehicle being parked. Since in this instance the variance will meet or exceed the predetermined variance threshold, motion can be detected by the MCU. Thus, the absolute magnetic field, frequency or phase of the measurement signal is not required for the motion detection because the variance alone is sufficient.

The MCU controls the pressure sensor of the TPMS and remains in a low-state while a vehicle is parked to conserve energy. Thus, during low-power state, the MCU does not measure or transmit pressure information.

Upon determining, by the MCU, that the wheel or vehicle is not moving (i.e., the vehicle is parked), the MCU may continue to monitor for motion detection, but may remain in a low-power state. During the low-power state, the MCU detects the motion state of the vehicle (e.g., moving or non-moving), and, if motion is not detected, remains in low-power state to regularly perform motion detection. On the other hand, when motion is detected, the MCU will wake-up from the low-power state at regular intervals to receive, measure and/or transmit pressure information, as well as continue to perform the motion detection, until the MCU determines the vehicle is parked. Here, the MCU may control the pressure sensor to wake up to make a pressure measurement of the tire, and send the measurement information (i.e., pressure information) to the MCU. If the MCU determines that the vehicle is again in a parked state, it will again enter the low-power state and may only monitor for motion. Thus, the MCU may continuously monitor the motion of the magnetic sensor regardless of its own power state.

Figure 7A:
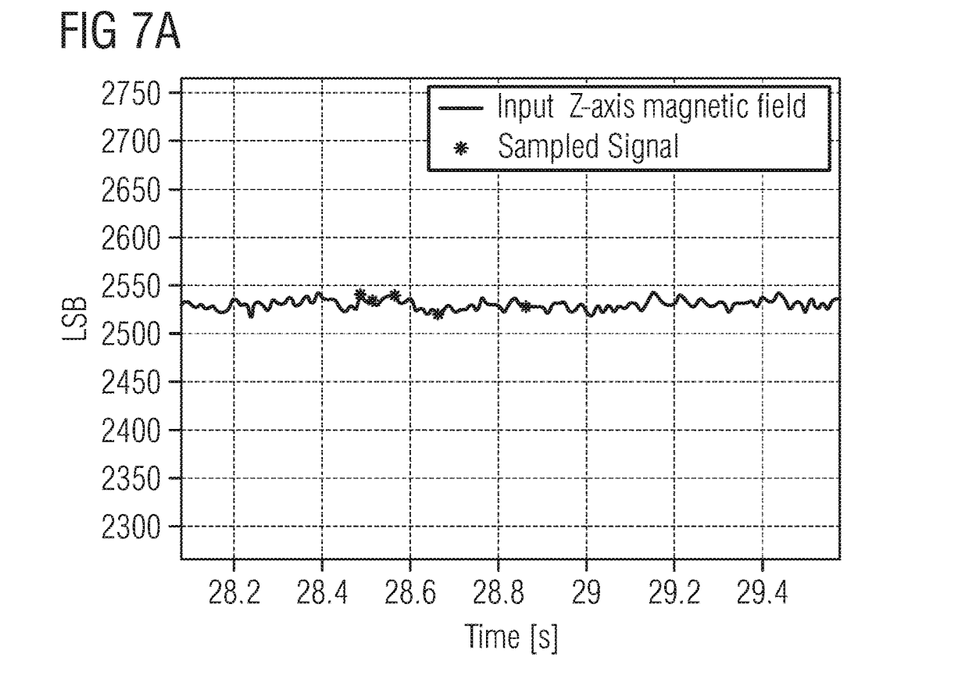
FIGS. 7A-7C illustrate examples of measurement signals output by a magnetic sensor and sampled by an microcontroller unit (MCU) according to one or more embodiments.
Figure 7B:
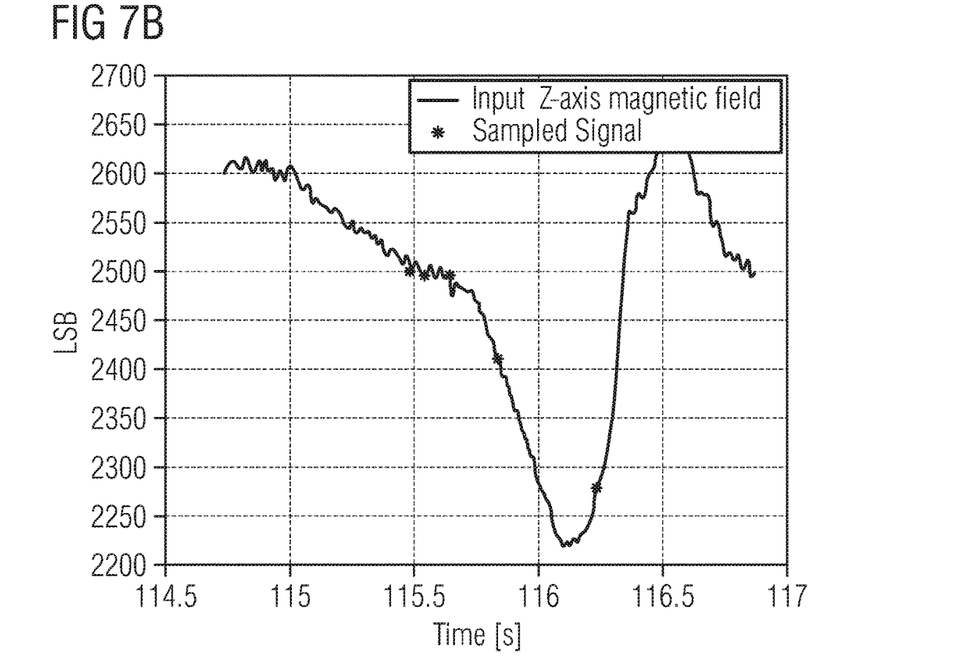
Figure 7C:
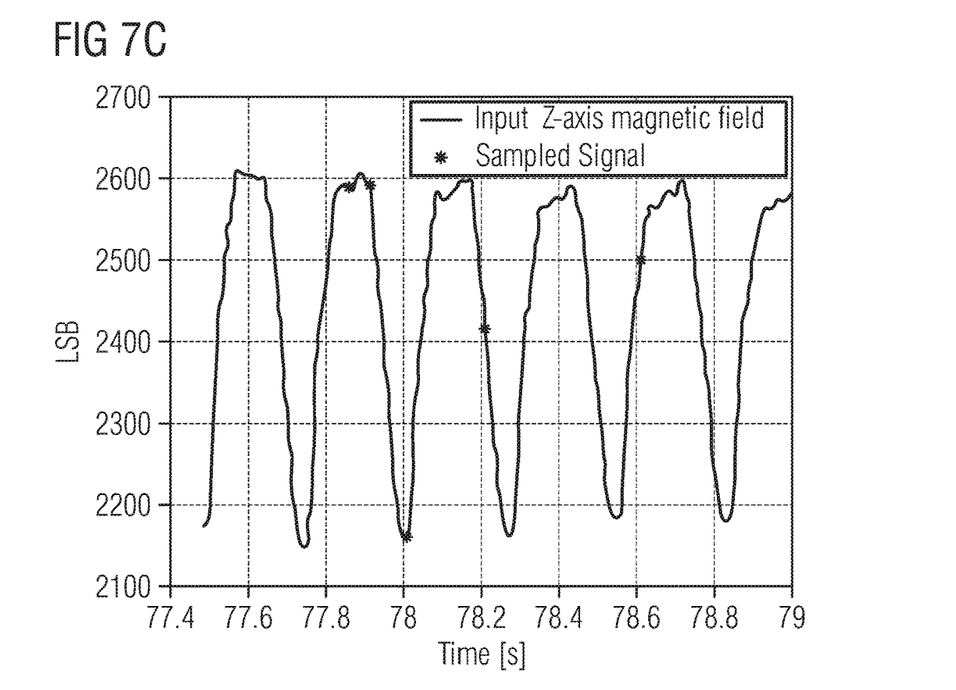

FIGS. 7A-7C illustrate examples of measurement signals output by a magnetic sensor and sampled by an MCU according to one or more embodiments. In particular, FIG. 7A shows a measurement signal measured during a parked state, a small variance existing due to stray field noise. Accordingly to non-uniform samples taken by the MCU, a variance of 77 is calculated by the MCU, which falls below a predetermined variance threshold. In this case, the MCU determines the vehicle is in a parked state and remains in a low-power state.

On the other hand, FIG. 7B shows a measurement signal measured during a moving state of less than 20 km/h. Accordingly to non-uniform samples taken by the MCU, a variance of 9,113 is calculated by the MCU, which is above the predetermined variance threshold. In this case, the MCU determines the vehicle is in a moving and begins or continues measuring pressure information provided by the pressure sensor, and transmits the pressure information to the RF transmitter for transmission.

Similarly, FIG. 7C shows a measurement signal measured during a moving state of greater than 20 km/h. Accordingly to non-uniform samples taken by the MCU, a variance of 31,806 is calculated by the MCU, which is above the predetermined variance threshold. In this case, the MCU determines the vehicle is in a moving and begins or continues measuring pressure information provided by the pressure sensor, and transmits the pressure information to the RF transmitter for transmission.

While the above embodiments are described in the context of using the x-axis as the sensing axis, any axis may be used as long as the sensing axis is aligned to oscillate between parallel and anti-parallel alignments relative to the Earth's magnetic field vector Bref, or such that a periodic signal is generated as the magnetic sensor rotates through the Earth magnetic field. Furthermore, in the case where a magnetic sensor includes two or three possible sensing axes, only one needs to be used for the motion detection, while the other sensing axes may be used for other applications.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Thus, a more robust sensing system capable of determining motion at speeds of less than 20 km/hr may be realized by above embodiments.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A sensor module comprising:
   a magnetic sensor configured to measure a magnitude of a magnetic field component of an Earth magnetic field projected on a sensing axis of the magnetic sensor and configured to generate a measurement signal based on the magnitude of the magnetic field component projected on the sensing axis, wherein the magnetic sensor is configured to rotate about an axis through the Earth magnetic field such that the measurement signal oscillates between a first extrema and a second extrema as the magnitude of the magnetic field component projected onto the sensing axis changes due to rotation of the magnetic sensor about the axis; and
   a microcontroller configured to receive the measurement signal from the magnetic sensor, acquire a predetermined number of measurement samples from the measurement signal over a predetermined sampling period, calculate a variance value of a magnitude of the acquired measurement samples, and determine whether the magnetic sensor is rotating about the axis based on a threshold test of the variance value,
   wherein the predetermined number is three or more, and the microcontroller is configured to calculate the variance value based on all the measurement samples acquired over the predetermined sampling period.

2. The sensor module of claim 1, wherein the microcontroller is configured to acquire the predetermined number of measurement samples from the measurement signal at non-uniform intervals over the predetermined sampling period such that a time interval between an acquisition of a first two adjacent measurement samples is different than a time interval between an acquisition of a second two adjacent measurement samples.

3. The sensor module of claim 2, wherein the acquired measurement samples from which the variance value is calculated includes the first two adjacent measurement samples and the second two adjacent measurement samples.

4. The sensor module of claim 1, wherein the microcontroller is configured to acquire the predetermined number of measurement samples from the measurement signal at uniform intervals over the predetermined sampling period.

5. The sensor module of claim 1, wherein, during rotation of magnetic sensor about the axis, the magnetic sensor is configured to generate the measurement signal as a sinusoidal waveform based on the sensing axis rotating through the Earth magnetic field.

6. The sensor module of claim 5, wherein the microcontroller is configured to detect the sinusoidal waveform independent from noise measured by the magnetic sensor.

7. The sensor module of claim 1, wherein the microcontroller determines that the magnetic sensor is rotating about the axis on a condition that the variance value is equal to or greater than a variance threshold value, and determines that the magnetic sensor is not rotating about the axis on a condition that the variance value is less than the variance threshold value.

8. The sensor module of claim 1, wherein, the microcontroller is configured to continuously monitor for motion of the magnetic sensor at predetermined sampling periods, and, on a condition the microcontroller determines that the magnetic sensor is stationary, the microcontroller is configured in a low-power state until motion of the magnetic sensor is detected.

9. The sensor module of claim 1, further comprising:
   a transmitter electrically connected to the microcontroller; and
   a pressure sensor electrically connected to the microcontroller,
   wherein, on a condition the microcontroller determines that the magnetic sensor is rotating about the axis, the microcontroller is configured to receive pressure information from the pressure sensor and transmit the pressure information to the transmitter for transmission.

10. The sensor module of claim 9, wherein on the condition the microcontroller determines that the magnetic sensor is rotating about the axis, the microcontroller is configured to control the pressure sensor to acquire the pressure information.

11. The sensor module of claim 1, wherein, on a condition the microcontroller determines that the magnetic sensor is rotating about the axis, the microcontroller is configured to exit a low-power state at regular intervals to acquire pressure information and re-enter the low-power state between pressure information acquisitions until the microcontroller determines that the magnetic sensor is no longer rotating about the axis.

12. The sensor module of claim 1, wherein the magnetic sensor is configured to measure the magnitude of the magnetic field component based on an alignment of the sensing axis to the magnetic field component.

13. A method of motion detection comprising:
   measuring a magnitude of a magnetic field component of an Earth magnetic field projected on a sensing axis of a magnetic sensor, wherein the magnetic sensor is configured to rotate about an axis through the Earth magnetic field;
   generating a measurement signal based on the magnitude of the magnetic field component projected on the sensing axis, wherein, as the magnetic sensor rotates about the axis through the Earth magnetic field, the measurement signal oscillates between a first extrema and a second extrema as the magnitude of the magnetic field component projected onto the sensing axis changes due to rotation of the magnetic sensor about the axis;
   acquiring a predetermined number of measurement samples from the measurement signal over a predetermined sampling period;
   calculating a variance value of a magnitude of the acquired measurement samples, wherein the predetermined number is three or more, and the variance value is calculated based on all the measurement samples acquired over the predetermined sampling period; and determining whether the magnetic sensor is rotating about the axis based on a threshold test of the variance value.

14. The method of claim 13, wherein acquiring the predetermined number of measurement samples includes acquiring the predetermined number of measurement samples from the measurement signal at non-uniform intervals over the predetermined sampling period such that a time interval between an acquisition of a first two adjacent measurement samples is different than a time interval between an acquisition of a second two adjacent measurement samples.

15. The method of claim 14, wherein the acquired measurement samples from which the variance value is calculated includes the first two adjacent measurement samples and the second two adjacent measurement samples.

16. The method of claim 13, wherein acquiring the predetermined number of measurement samples includes acquiring the predetermined number of measurement samples from the measurement signal at uniform intervals over the predetermined sampling period.

17. The method of claim 13, wherein, during rotation of magnetic sensor about the axis, generating the measurement signal as a sinusoidal waveform based on the sensing axis rotating through the Earth magnetic field.

18. The method of claim 17, further comprising:
detecting the sinusoidal waveform independent from noise measured by the magnetic sensor.

19. The method of claim 13, further comprising:
determining that the magnetic sensor is rotating about the axis on a condition that the variance value is equal to or greater than a variance threshold value; and
determining that the magnetic sensor is not rotating about the axis on a condition that the variance value is less than the variance threshold value.

20. The method of claim 13, further comprising:
continuously monitoring for motion of the magnetic sensor at predetermined sampling periods, and, on a condition that the magnetic sensor is determined to be stationary, maintaining the magnetic sensor in a low-power state until motion of the magnetic sensor is detected.

21. The method of claim 13, wherein, on a condition of determining that the magnetic sensor is rotating about the axis:
receiving pressure information from a pressure sensor; and
transmitting the pressure information to a transmitter for transmission to an external device.

22. The method of claim 21, wherein on the condition of determining that the magnetic sensor is rotating about the axis, controlling the pressure sensor to acquire the pressure information.

23. The method of claim 13, wherein, on a condition of determining that the magnetic sensor is rotating about the axis, exiting a low-power state at regular intervals to acquire pressure information and re-enter the low-power state between pressure information acquisitions until determining that the magnetic sensor is no longer rotating about the axis.

24. A tire pressure monitoring system (TPMS) comprising:
a tire having an axis of rotation;
a magnetic sensor fixed to the tire and configured to monitor rotation of the tire by measuring a magnitude of a magnetic field component of an Earth magnetic field projected on a sensing axis of the magnetic sensor, wherein the magnetic sensor is configured to generate a measurement signal based on the magnitude of the magnetic field component projected on the sensing axis, wherein the magnitude of the magnetic field component projected on the sensing axis changes as the magnetic sensor rotates about the axis of rotation;
a microcontroller configured to receive the measurement signal from the magnetic sensor, acquire a predetermined number of measurement samples from the measurement signal over a predetermined sampling period, calculate a variance value of a magnitude of the acquired measurement samples, and determine whether the tire is rotating about the axis of rotation based on a threshold test of the variance value,
wherein the predetermined number is three or more, and the microcontroller is configured to calculate the variance value based on all the measurement samples acquired over the predetermined sampling period.

25. The TPMS of claim 24, wherein the microcontroller is configured to acquire the predetermined number of measurement samples from the measurement signal at non-uniform intervals over the predetermined sampling period such that a time interval between an acquisition of a first two adjacent measurement samples is different than a time interval between an acquisition of a second two adjacent measurement samples.

26. The TPMS of claim 25, wherein the acquired measurement samples from which the variance value is calculated includes the first two adjacent measurement samples and the second two adjacent measurement samples.

27. The TPMS of claim 24, wherein the microcontroller is configured to acquire the predetermined number of measurement samples from the measurement signal at uniform intervals over the predetermined sampling period.

28. The TPMS of claim 24, further comprising:
a pressure sensor electrically connected to the microcontroller and configured to measure an internal air pressure of the tire; and
a transmitter electrically connected to the microcontroller and configured to receive pressure information from the microcontroller and transmit the pressure information as a data signal,
wherein, on a condition the microcontroller determines that the tire is rotating about the axis of rotation, the microcontroller is configured to receive pressure information from the pressure sensor and transmit the pressure information to the transmitter for transmission.

29. The TPMS of claim 28, wherein, on the condition the microcontroller determines that the tire is rotating about the axis of rotation, the microcontroller is configured to control the pressure sensor to acquire the pressure information.

30. The TPMS of claim 24, wherein the sensing axis of the magnetic sensor is aligned tangential to a circle that is concentric to the axis of rotation and sensitive to at least one magnetic field component of the Earth magnetic field.

* * * * *